(12) United States Patent
Croisetiere

(10) Patent No.: US 7,694,452 B2
(45) Date of Patent: Apr. 13, 2010

(54) BAIT LAUNCHER

(76) Inventor: Leo R. Croisetiere, 7345 Indiantown Rd., King George, VA (US) 22485

( * ) Notice: Subject to any disclaimer, the term of this patent is extended or adjusted under 35 U.S.C. 154(b) by 190 days.

(21) Appl. No.: 11/895,522

(22) Filed: Aug. 27, 2007

(65) Prior Publication Data

US 2009/0056193 A1 Mar. 5, 2009

(51) Int. Cl.
*A01K 91/02* (2006.01)

(52) U.S. Cl. ............................ 43/19; 124/56; 124/61; 124/71; 124/73

(58) Field of Classification Search .......... 43/19; 124/56, 60, 61, 69–71, 73, 75–77
See application file for complete search history.

(56) References Cited

U.S. PATENT DOCUMENTS

| | | | | |
|---|---|---|---|---|
| 344,936 A * | 7/1886 | Bartlett | | 124/73 |
| 605,216 A * | 6/1898 | Boddam | | 124/75 |
| 764,853 A * | 7/1904 | Kimberlin | | 43/19 |
| 884,024 A * | 4/1908 | Lake | | 124/73 |
| 1,017,746 A * | 2/1912 | Glerum | | 124/73 |
| 1,245,093 A * | 10/1917 | Doubleday | | 124/73 |
| 1,262,004 A * | 4/1918 | Beachy | | 124/65 |
| 1,324,772 A * | 12/1919 | Goodyear | | 124/75 |
| 1,366,577 A * | 1/1921 | Mahern et al. | | 124/56 |
| 1,379,403 A * | 5/1921 | Green | | 124/75 |
| 1,405,664 A * | 2/1922 | Boileau | | 124/75 |
| 1,473,507 A * | 11/1923 | Obermaier | | 43/19 |
| 1,709,496 A * | 4/1929 | Smyth | | 251/74 |
| 1,810,779 A * | 6/1931 | Milam | | 43/19 |
| 2,090,731 A * | 8/1937 | Klein | | 43/19 |
| 2,153,315 A * | 4/1939 | Richter | | 43/19 |
| 2,182,369 A * | 12/1939 | Barron | | 124/81 |
| 2,296,834 A * | 9/1942 | Boynton | | 124/75 |
| 2,357,951 A * | 9/1944 | Hale | | 124/75 |
| 2,526,018 A * | 10/1950 | Foster et al. | | 124/73 |
| 2,548,439 A * | 4/1951 | Moffett, Jr. | | 124/70 |
| 2,574,408 A * | 11/1951 | Moe | | 124/73 |
| 2,581,758 A * | 1/1952 | Galliano et al. | | 124/75 |
| 2,605,569 A * | 8/1952 | Kronhaus et al. | | 43/19 |
| 2,645,218 A * | 7/1953 | Fisher | | 43/19 |
| 2,674,989 A * | 4/1954 | Morsch | | 124/73 |
| 2,809,624 A * | 10/1957 | Becher et al. | | 124/77 |
| 2,856,911 A * | 10/1958 | Maxwell | | 43/19 |
| 2,924,211 A * | 2/1960 | McSwain | | 43/19 |
| 2,955,585 A * | 10/1960 | Friedland et al. | | 124/73 |
| 2,958,975 A * | 11/1960 | Neff et al. | | 43/19 |
| 2,960,083 A * | 11/1960 | Grimland et al. | | 124/73 |

(Continued)

OTHER PUBLICATIONS

Internet advertisement, http://faroutfishin.com/gallery.cfm, downloaded Jun. 26, 2007, Home of the Shore Shot Bait Caster.

*Primary Examiner*—Darren W Ark
(74) *Attorney, Agent, or Firm*—Eugene H. Eickholt

(57) ABSTRACT

A device is disclosed that pneumatically propels a fishing lure or bait/weight combination a great distance. Pneumatic pressure is provided in combination with a conventional ice chest. A pneumatic tube is releasably provided from the ice chest. The pneumatic tube also operates as a handle to pull the ice chest on wheels when the pneumatic tube is in storage position. A power piston located within the pneumatic tube propels the fishing lure or bait/weight combination with pneumatic pressure is released with a valve mechanism.

12 Claims, 5 Drawing Sheets

U.S. PATENT DOCUMENTS

| | | | | | |
|---|---|---|---|---|---|
| 2,977,706 | A | * | 4/1961 | Merz | 43/19 |
| 3,001,316 | A | * | 9/1961 | Fefelov | 43/19 |
| 3,015,182 | A | * | 1/1962 | Tuttle et al. | 43/19 |
| 3,018,769 | A | * | 1/1962 | Parsoneault | 124/75 |
| 3,046,966 | A | * | 7/1962 | Butler et al. | 124/73 |
| 3,138,149 | A | * | 6/1964 | Sinclair | 43/19 |
| 3,255,548 | A | * | 6/1966 | Whritenour | 43/19 |
| 3,288,127 | A | * | 11/1966 | Bullock | 124/73 |
| 3,345,977 | A | * | 10/1967 | Hall | 124/77 |
| 3,400,703 | A | * | 9/1968 | Rhodes | 124/75 |
| 3,419,991 | A | * | 1/1969 | Mitchell | 43/19 |
| 3,428,037 | A | * | 2/1969 | Sacerdote et al. | 124/61 |
| RE26,662 | E | * | 9/1969 | Hall | 124/77 |
| 3,507,264 | A | * | 4/1970 | Cupps et al. | 124/61 |
| 3,583,381 | A | * | 6/1971 | Eaton et al. | 124/73 |
| 3,662,729 | A | * | 5/1972 | Henderson | 124/73 |
| 3,717,947 | A | * | 2/1973 | Nomura | 43/19 |
| 3,724,437 | A | * | 4/1973 | Halstead | 124/78 |
| 3,777,732 | A | * | 12/1973 | Holloway et al. | 124/78 |
| 3,802,407 | A | * | 4/1974 | Imazu | 124/77 |
| 3,828,459 | A | * | 8/1974 | Easom | 43/19 |
| 3,834,056 | A | * | 9/1974 | Filippi et al. | 43/19 |
| 3,838,676 | A | * | 10/1974 | Kahelin | 124/75 |
| 3,855,988 | A | * | 12/1974 | Sweeton | 124/56 |
| 3,905,349 | A | * | 9/1975 | Nielsen et al. | 124/73 |
| 3,915,143 | A | * | 10/1975 | Waller | 124/77 |
| 4,002,336 | A | * | 1/1977 | Beaver et al. | 124/56 |
| 4,004,567 | A | * | 1/1977 | Henderson | 124/61 |
| 4,027,646 | A | * | 6/1977 | Sweeton | 124/56 |
| 4,086,902 | A | * | 5/1978 | Reynolds | 124/61 |
| 4,091,791 | A | * | 5/1978 | Castelli et al. | 124/73 |
| 4,207,857 | A | * | 6/1980 | Balka, Jr. | 124/56 |
| 4,237,851 | A | * | 12/1980 | Haller | 124/16 |
| 4,241,717 | A | * | 12/1980 | Mariani | 124/56 |
| 4,270,511 | A | * | 6/1981 | Ehama | 124/56 |
| 4,280,248 | A | * | 7/1981 | Herubel | 124/75 |
| 4,291,665 | A | * | 9/1981 | Bash et al. | 124/56 |
| 4,372,283 | A | * | 2/1983 | Balka, Jr. | 124/56 |
| 4,570,607 | A | * | 2/1986 | Stokes | 124/56 |
| 4,631,852 | A | * | 12/1986 | Whritenour | 43/19 |
| 4,774,928 | A | * | 10/1988 | Kholin | 124/75 |
| 4,784,107 | A | * | 11/1988 | Kelly | 124/61 |
| 4,858,921 | A | * | 8/1989 | Eustice et al. | 124/56 |
| 5,060,413 | A | * | 10/1991 | Garcia | 43/19 |
| 5,133,330 | A | * | 7/1992 | Sharp | 124/56 |
| 5,193,298 | A | * | 3/1993 | O'Neill | 43/19 |
| 5,224,701 | A | * | 7/1993 | Sciarrillo et al. | 124/73 |
| 5,228,427 | A | * | 7/1993 | Gardner, Jr. | 124/71 |
| 5,257,615 | A | * | 11/1993 | Jones | 124/56 |
| 5,337,726 | A | * | 8/1994 | Wood | 124/61 |
| 5,421,116 | A | * | 6/1995 | Moon | 43/19 |
| 5,450,839 | A | * | 9/1995 | Nicolaevich et al. | 124/73 |
| 5,496,025 | A | * | 3/1996 | Phillips et al. | 124/56 |
| 5,507,271 | A | * | 4/1996 | Actor | 124/56 |
| 5,553,599 | A | * | 9/1996 | Benavides | 124/73 |
| 5,660,160 | A | * | 8/1997 | Prescott, Jr. | 124/75 |
| 5,785,038 | A | * | 7/1998 | Mattern | 124/56 |
| 5,823,894 | A | * | 10/1998 | Actor | 124/56 |
| 5,887,578 | A | * | 3/1999 | Backeris et al. | 124/56 |
| 5,980,399 | A | * | 11/1999 | Campbell et al. | 124/61 |
| 6,276,353 | B1 | * | 8/2001 | Briggs et al. | 124/71 |
| 6,347,623 | B1 | * | 2/2002 | Kownacki et al. | 124/56 |
| 6,497,066 | B1 | * | 12/2002 | Harrison | 43/19 |
| 6,761,157 | B2 | * | 7/2004 | Bartek | 124/56 |
| 6,807,959 | B1 | * | 10/2004 | Murdock et al. | 124/61 |
| 6,895,949 | B1 | * | 5/2005 | Stephens | 124/6 |
| 7,252,079 | B1 | * | 8/2007 | Walker | 124/65 |
| 7,383,833 | B2 | * | 6/2008 | Stevens | 124/73 |
| 7,409,794 | B2 | * | 8/2008 | Triano et al. | 43/19 |
| 7,562,843 | B2 | * | 7/2009 | Lipponen | 124/56 |
| 2002/0185120 | A1 | * | 12/2002 | Scott | 124/78 |
| 2004/0139647 | A1 | * | 7/2004 | Esberger | 43/19 |
| 2005/0108919 | A1 | * | 5/2005 | Staelens et al. | 43/19 |
| 2005/0115548 | A1 | * | 6/2005 | Wilson | 124/56 |
| 2006/0011183 | A1 | * | 1/2006 | Dziob | 124/71 |
| 2006/0042611 | A1 | * | 3/2006 | Karellas | 124/61 |
| 2006/0059764 | A1 | * | 3/2006 | Triano et al. | 43/19 |
| 2006/0086349 | A1 | * | 4/2006 | Kamen et al. | 124/71 |
| 2006/0185219 | A1 | * | 8/2006 | Giordano et al. | 43/19 |
| 2007/0214705 | A1 | * | 9/2007 | Osenbauch et al. | 43/19 |
| 2007/0251136 | A1 | * | 11/2007 | Mamae | 43/19 |
| 2008/0210210 | A1 | * | 9/2008 | Colby | 124/73 |
| 2008/0223350 | A1 | * | 9/2008 | Mahany | 124/56 |
| 2009/0178328 | A1 | * | 7/2009 | Jelnicki, Jr. | 43/19 |
| 2009/0178329 | A1 | * | 7/2009 | Jelnicki, Jr. | 43/19 |

* cited by examiner

BAIT LAUNCHER

FIELD OF THE INVENTION

This invention relates to fishing tackle, in particular pneumatic casting mechanisms.

BRIEF DESCRIPTION OF THE INVENTION

A conventional fishing rod/reel combination is combined with a pneumatic casting tube, which propels a fishing lure or baited hook and weight much farther than the rod can propel the lure or bait when the rod is used alone. A piston slidingly engaged within the tube is rapidly accelerated with compressed air. The fishing lure or baited hook/weight are held within a cup that is secured to the distal end of the piston, the distal end defined as the end furthest from the ice chest. When the piston is accelerated, and reaches the end of its predetermined travel path, the fishing lure or baited hook/weight leave the tube at a high velocity and reach the suitable distance desired, as determined by the pneumatic pressure.

The pneumatic casting tube is attached to an ice cooler, on wheels. In this manner, the combination of the ice cooler and pneumatic casting mechanism can be readily transported to the location intended. This is especially useful for surf fishing, where the fishing lure or baited hook/weight combination is to be cast a long distance, normally past the surf into areas where backwash of the surf collects food, and fish congregate. Inside the ice cooler a pneumatic pump is separated from the iced compartment. The pneumatic pump provides the necessary air pressure to propel the piston.

BACKGROUND

Devices that propel a fishing lure or a weighted bait have been the subject of numerous patents. U.S. Pat. No. 3,828,459 to Easom shows a pneumatic rifle cast fishing rod. The pneumatic means is integral with the fishing rod.

U.S. Pat. No. 3,419,991 shows a pneumatic device located within the handle portion of a fishing rod, that propels the lure.

Unlike the present invention, none of the prior art pneumatic casting devices utilizes a conventional fishing rod. Nor do they incorporate an ice chest. An ice chest is especially useful when surf fishing, often in the hot sun. The hot beach climate both spoils fish caught very quickly, and makes fishermen thirsty quickly. Therefore, the ice chest is very useful in itself, and provides a convenient location for pneumatic pressure means. The ice chest also offers an excellent location for a rod holder, to hold the rod when casting or waiting for a fish to bite.

The instant invention is particularly adapted to allow a handicapped individual to fully enjoy the sport of fishing.

DETAILED DESCRIPTION OF THE DRAWINGS

Figure 1:
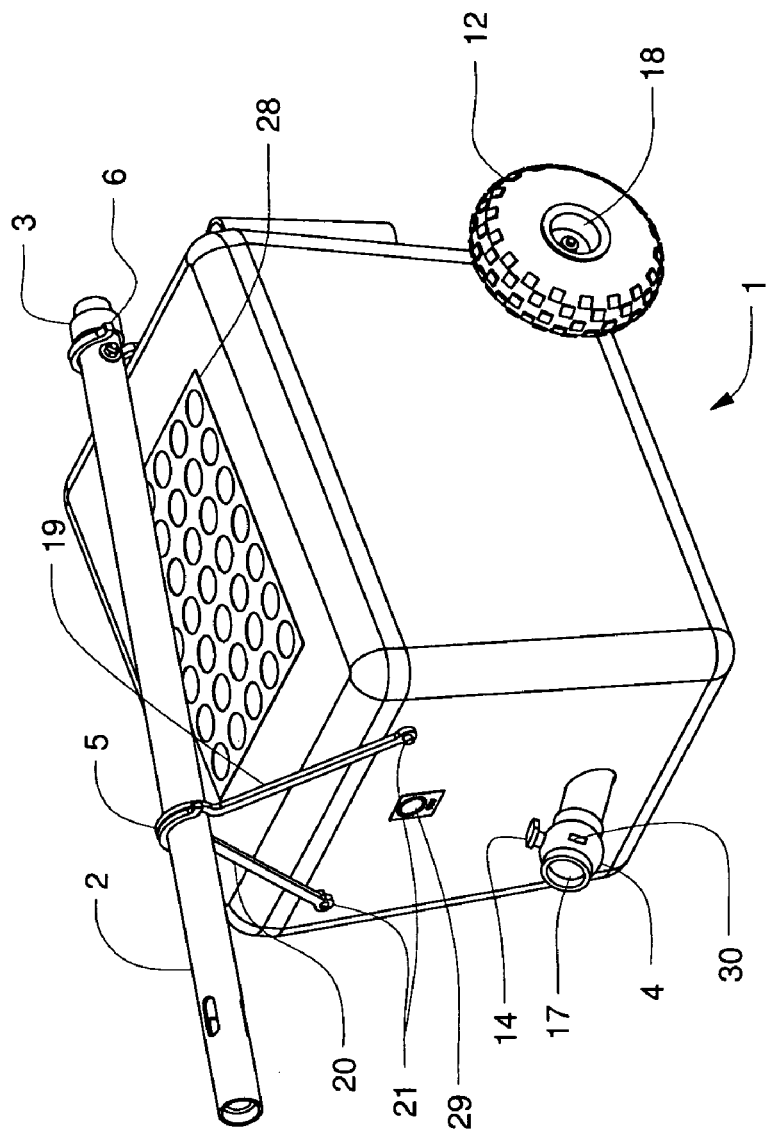
FIG. 1 shows an ice chest (1), with wheels, that can be rolled to location. Tube (2) is releasable connected to sleeve connector (3) using cam lock (4). In this view, tube (2) is shown dissembled from the ice chest, in a travel mode. Connectors (5) and (6) releaseably attach the tube to the ice chest.

Referring to FIG. 1, pneumatic tube (2) is shown in storage position held between clamps (5) and (6), and resting on the top of ice chest (1). Ice chest (1) includes wheels (12), secured to the ice chest with axle (18). Clamp (5) is comprised of two members (19) and (20), connected to the front of ice chest (1) with rivets (21). The two clamp members (19) and (20) are rotatable around rivets (21). The end of clamp members (19) and (20) opposite the rivets are provided with semi-circular hook-like clamps that releaseably wrap around the pneumatic tube. At the opposite end of the pneumatic tube, a single clamping member (6) is rotatably secured to the back of the ice chest. Similar to the front semi-circular clamp members, the back clamping member snaps over the pneumatic tube. The semi-circular portions of the front and back clamping members is somewhat more than 180 degrees, so that the clamping members positively snap over the pneumatic tube. The clamping members can release the pneumatic tube by applying an upwards pressure to the semi-circular end portion, thereby increasing the diameter of the clamping members until the pneumatic tube can be easily removed from the grasp of the semi-circular end portions of the clamping members. The pneumatic tube extends beyond the front portion of ice chest (1), thereby forming a handle with which the ice chest (1) can be pulled and moved to a suitable location for fishing.

Although the Figures show semi-circular ended metallic clamps, it is expressly understood that other clamping means can be used to secure the pneumatic tube to the ice chest, such as elastic cords, commonly called bungee cords.

Protruding from the front side of the ice chest is connector (4), that releasable engages the pneumatic tube (2). The pneumatic tube (2) extends through a wall of the ice chest so as to provide a connection between the pneumatic tube (2) and the pump (11) and air chamber (23) after disengaging the pneumatic tube (2) from the clamping members (19) and (20), the pneumatic tube is inserted in ferrule like fashion into connector (4). The proximal end of pneumatic tube (2) is the male member made to fit within the female section of connector (4). A cam lock fitting is provided on the female connector, to securely lock the male connector located on the ice chest to the pneumatic tube. A handle (30) provides a rotatable means to cam the pneumatic tube to connector (4). Although a cam mechanism is shown in the accompanying drawings, any conventional securing means is suitable for this, such as is well known in the art. For instance, a detent type of connection can be provided on the outside surface of connector (4) that snaps into a corresponding detent connection on the inside surface of pneumatic tube (2). When an power source is used, a conventional electrical connection to the pump is provided, such as a standard female electrical jack (29).

Figure 2:
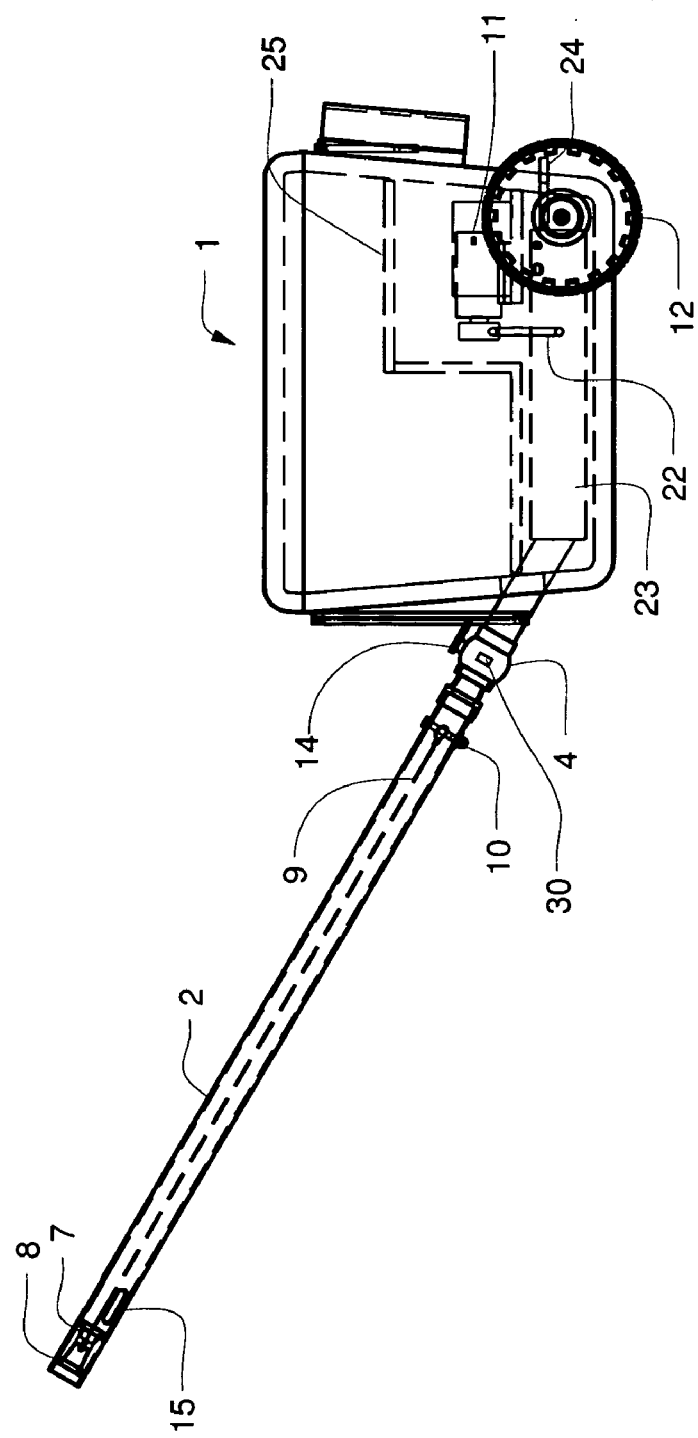
FIG. 2 shows the ice chest (1) and pneumatic tube (2) in profile with the pneumatic tube (2) in operating assembled mode. Power piston (7), with a capsule (8) at its distal end, is at the outermost position, for instance after a cast has been made. Lanyard (9) limits the travel of the power piston (7) preventing the power piston and capsule from exiting the pneumatic tube following a cast. The lanyard (9) is attached to the proximal end of the pneumatic tube (2) with a screw (10), or other appropriate securing mechanism. As used herein, the proximal end is the end closest to the ice chest. Pneumatic pump (11) is shown above wheels (12).

Referring to FIG. 2, the pneumatic tube (2) is shown attached to connector (4), in the position immediately following the casting of the fishing lure or bait/weight combination. The normal angle between the pneumatic tube and the ice chest is approximately 45 degrees, enabling maximum distance for the fishing lure or bait/weight combination. Cross bolt (10) extends through the proximal portion of the pneumatic tube (2), closest to the connector (4). Lanyard (9) is secured to the cross bolt (10) on one end, and to the power piston (7) on the other end. Lanyard (9) is long enough to enable power piston (7) to travel past orifice (15), but does not allow power piston (7) to leave the open distal end of pneumatic tube (2). Orifice (15) enables pneumatic pressure within pneumatic tube (2) to be released, by escape through orifice (15) after power piston (7) is propelled past orifice (15).

Figure 4:
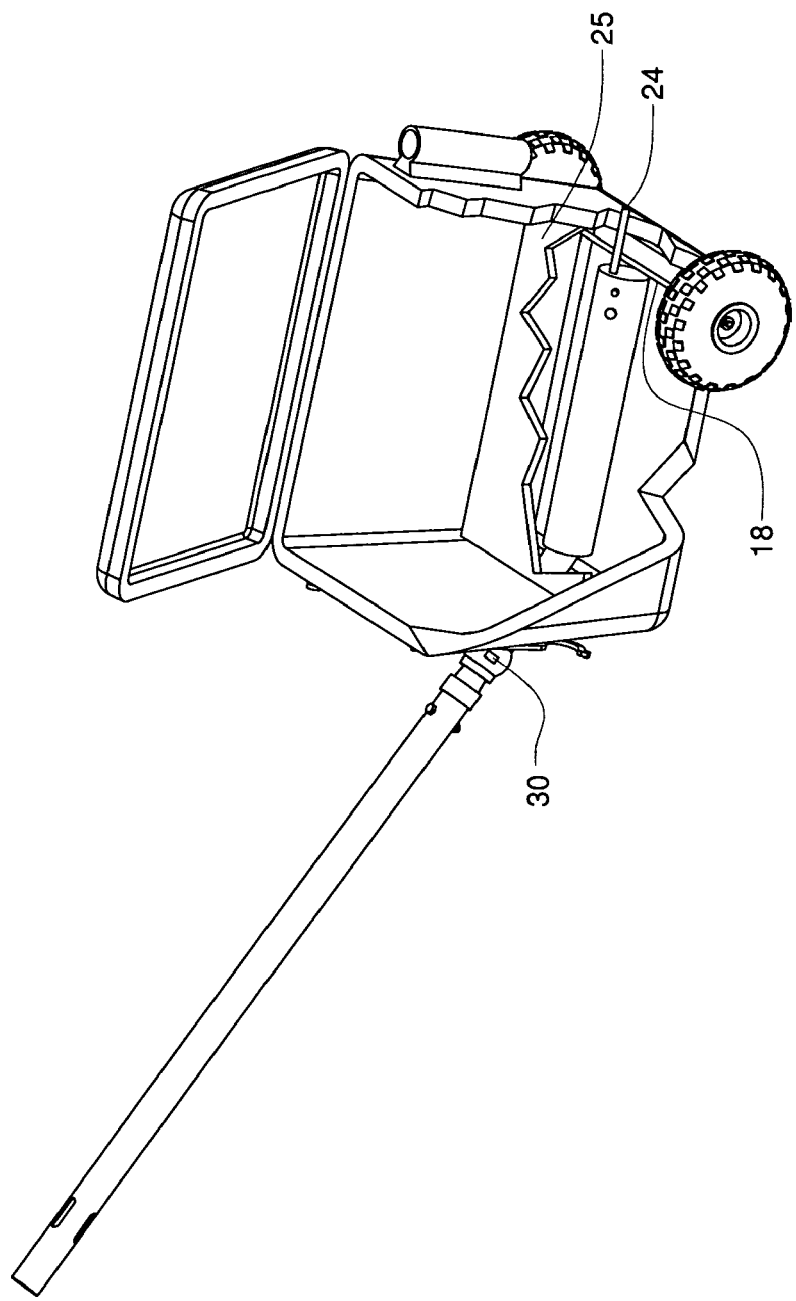
FIG. 4 shows a pneumatic cylinder, where compressed gas accumulates via the pneumatic pump. In this embodiment, a pneumatic pump is located external of the ice chest, and connects to the pneumatic cylinder through valve connector (24).

Pump (11) provides air under pressure to air chamber (23) through air conduit (22). The pneumatic pump (11) is powered by a source of direct voltage, such as a 12 volt gel cell, or wet cell motorcycle battery. The battery is conveniently located on the right side of pneumatic pump (11). The battery is electrically connected to pneumatic pump (11) through a positive and negative wires. A standard 12 volt fuse is conveniently located on either the positive or negative lead wires, that connect the battery and pump. It is expressly understood that an external battery is contemplated within the scope of the invention. An electrical pressure limiting switch is tied into the main air chamber (23). When the pneumatic pressure reaches the predetermined pressure, the pump switches off. This pressure limiting switch is set to limit the pressure within air chamber (23) to a maximum level, also preventing over pressurization and an ultimate dangerous rupture of air chamber (23). By adjustment of the pressure limiting switch, the distance of the cast is also controlled. The lower the pressure where the pressure limiting switch cuts off, the shorter the ultimate cast. A conventional ball valve is provided within connector (4), allowing the air under pressure to actuate and accelerate the power piston and cup By turning lever (14), the ball valve opens and air pressure is suddenly released, propelling the power piston and cup. Valve stem (24) is provided on the back side of ice chest (1). As best seen in FIG. 4, valve stem (24) is connected directly to air chamber (23), enabling an external air pump such as a 12 volt automobile tire pump, to be used as an alternative air pressure source for the internal air pump (11). Wall (25) is interposed between the ice chamber, where bait, fish and drinks, etc. are stored, and the inner chamber where the pneumatic pump, air chamber are located. A cylindrical rod holder (26) is attached to the back side of the ice chest (1), where the proximal handle portion of a fishing rod may be inserted. Although the Figures show one rod holder, it is understood that two or more rod holders can be used. It is also contemplated to provide a rod holder on the sides of the ice chest, for instance in a 45 degree angle to the ground, to hold the rods while fishing.

It is also contemplated within the scope of the invention to provide a solar panel (28), seen in FIG. 1, attached to the ice chest (1) that can directly supply electrical power to the pneumatic pump (11), or alternatively, to provide electrical current to a rechargeable battery pack.

Figure 3:
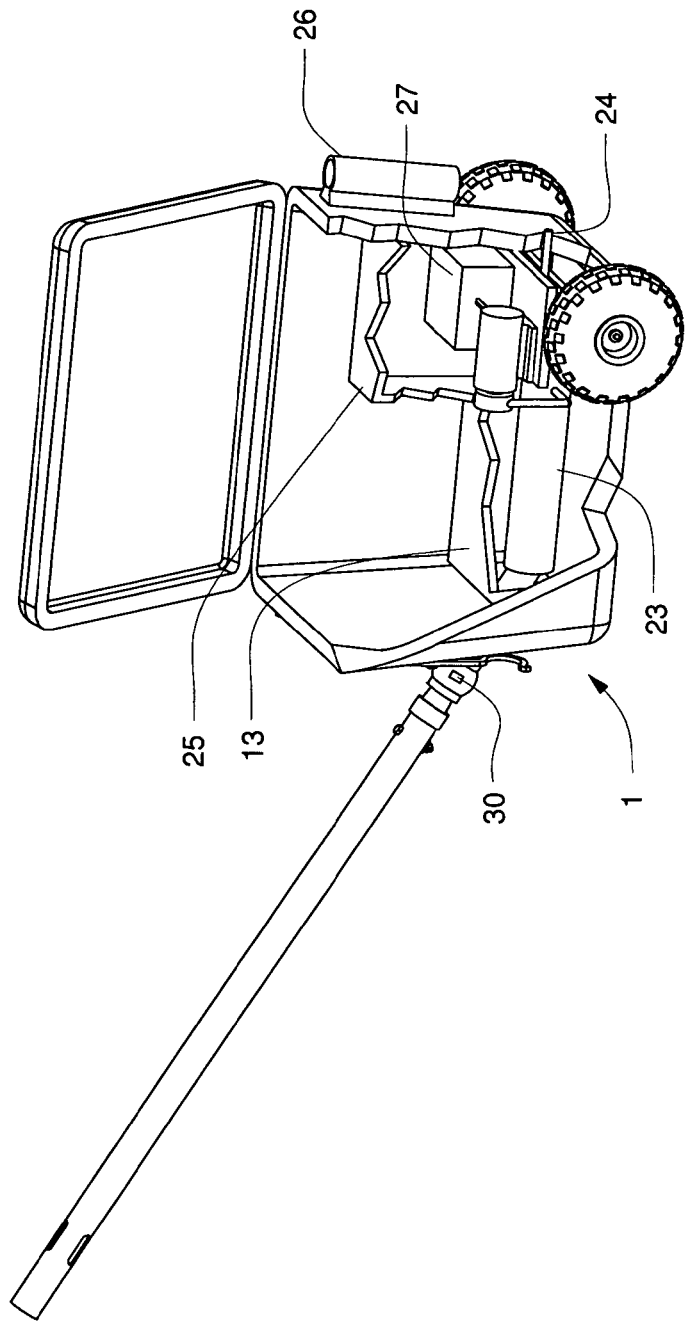
FIG. 3 shows the ice chest and pneumatic casting mechanism, with the ice chest in open condition. Interior wall (13) separates the pneumatic pump and battery from the ice chest and ice.

FIG. 3 is an isometric view of the ice chest with the pneumatic tube in working position, where the top of the ice chest is open. The battery (27) is seen to the right of pneumatic pump (11), under wall (25). Air chamber (23) is also located under wall (25). Rod holder (26) is seen secured to the back of the ice chest (1).

FIG. 4 is another embodiment of the invention, which utilizes an external pneumatic pump. The advantage of this embodiment is that less volume within the ice chest (1) is dedicated to the pneumatic pump and battery. Therefore, there is more volume available for ice and ice chest contents, such as bait, drinks and fish. As can be readily seen from FIG. 4, the wall portion is flat and just a few inches above the bottom, outside wall of the ice chest (1). Valve stem (25) extends beyond the back wall of ice chest (1), for attachment of a conventional 12 volt automobile pump. It is expressly understood that any pneumatic pump may be used and the invention is not limited to any particular pneumatic pump. Where normal wall outlets are available, for instance, a pump that utilizes alternating 120 volt current is usable.

Figure 5:
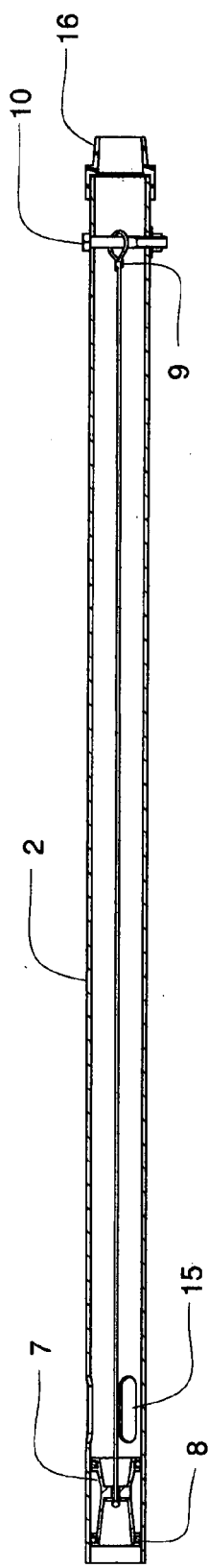
FIG. 5 shows the pneumatic tube (2) in section. Piston (7) and cup (8) are at the distal portion of pneumatic tube (2), where the piston and cup would stop at the completion of a cast. Lanyard (9) stops the travel of the piston and cup. Hole (15), located immediately below the piston (7) and cup (8), releases compressed air in the pneumatic tube (2) following a cast. Screw (10) transverses the centerline of pneumatic tube (2) at the proximal end of pneumatic tube (2). Lanyard (9) is secured to screw (10), to limit travel of piston (7) and cup (8) such that they do not exit the pneumatic tube (2). Sleeve (16) overlies the end of pneumatic tube (2) and tapers inwardly, to fit into a corresponding tapered tube (17) on the ice chest, with an interference fit. Pneumatic tube (2) is ordinarily made from orange PVC plastic, to enable easy visibility, so that individuals will not stand in front of the tube. Any bright color that alerts by-standers that to the presence of the pneumatic tube is appropriate.

FIG. 5 shows the pneumatic tube by itself. At the proximal end, male connector (16) is secured over the outside of pneumatic tube (2), using an interference fit. The male connector (16) could also be adhesively attached to pneumatic tube (2), or screwed, or attached in any conventional fashion. Male connector (16) has an end portion protruding past pneumatic tube (2) that tapers progressively towards a smaller outside diameter. This is intended to enable fitting within the female portion (17) of connector (4) located on the front side of the ice chest, for securing the pneumatic tube to the ice chest. A rotatable cam locking means secures the pneumatic tube to the female connector on the ice chest. The rotatable cam locking means is located on the female connector. Cross bolt (10) is shown extending through the pneumatic tube (2), with lanyard (9) attached to the cross bolt. Lanyard (9) is conveniently 1/16 inch aircraft cable or nylon rope. Lanyard (9) is just long enough to allow the power piston (7) to reach the proximal end of the pneumatic tube, and extend past orifices (15). When the power piston is reloaded for another cast, the weight of the fishing lure or bait/weight combination pushes the power piston down into the pneumatic tube and is stopped by cross bolt (10). In this position, the lanyard (9) drops into the pneumatic tube between the cross bolt and the male connector (16), in loose fashion. A ram rod is separately provided, to push the power piston and cup down into the pneumatic tube when the apparatus is being readied for another cast.

The invention claimed is:

1. A device for casting a fishing lure or bait/weight combination, comprising an ice chest, the ice chest including a connector having first and second ends, the first end of the connector being releasably connected to a proximal end of a pneumatic tube, the pneumatic tube having a power piston within the pneumatic tube that propels the fishing lure or bait/weight combination, a source of pneumatic pressure and an air chamber which are connected to the pneumatic tube by the connector, the connector extending from said first end through a wall of the ice chest to a second opposing end thereof located inside the ice chest and connected to the air chamber, the ice chest supporting at least the air chamber therein, the air chamber pressurized by the source of pneumatic pressure, a valve that is on the connector and interposed between the first and second ends of the connector, whereby operation of the valve releases air pressure to the pneumatic tube and propels the power piston down the pneumatic tube, thereby propelling the fishing lure or bait/weight combination down the pneumatic tube and launching the fishing lure or bait/weight combination.

2. The device of claim 1 further including a pressure relief switch operatively connected to the air chamber that limits the upper pressure within the air chamber, thereby eliminating the possibility of over pressurization of the air chamber.

3. The device of claim 1 wherein the source of pneumatic pressure is a pneumatic pump, wherein the pneumatic pump is located internally within the ice chest, and is electrically actuated, and includes a source of direct current to operate the pneumatic pump.

4. The device of claim 3 wherein the source of direct current is a battery.

5. The device of claim 4 wherein the battery is selected from the group consisting of a wet cell battery and a gel cell battery.

6. The device of claim 3 wherein the source of direct current is a solar panel.

7. The device of claim 3 wherein the source of direct current is a rechargeable battery.

8. The device of claim 7 wherein a solar panel is electrically connected to the rechargeable battery wherein the rechargeable battery is recharged while the device is in use.

9. The device of claim 1 where the source of pneumatic pressure is a pneumatic pump, wherein the pneumatic pump is located externally of the ice chest, connected to the air chamber through a valve stem that protrudes exterior of the ice chest.

10. The device of claim 1 wherein the pneumatic tube has a lanyard that limits travel of the power piston, the lanyard being connected to a cross bolt at the proximal end of the pneumatic tube that connects to the ice chest.

11. The device of claim 10 wherein the pneumatic tube has an orifice at a distal end thereof enabling pressure release when the power piston has been actuated.

12. The device of claim 1 wherein the ice chest is provided with wheels and with a clamping mechanism that holds the pneumatic tube securely above the ice chest, whereby the ice chest may be rolled along the ground with portions of the pneumatic tube being engaged by the clamping mechanism.

* * * * *